United States Patent Office 3,544,491
Patented Dec. 1, 1970

3,544,491
FOAMED COPOLYMER OF AN ETHYLENICALLY UNSATURATED MONOMER AND AN ALKENYL GUANAMINE AND PROCESS OF MAKING SAME
Joseph John Benischeck, Philadelphia, Pa., assignor to Rohm & Haas Company, Philadelphia, Pa., a corporation of Delaware
No Drawing. Filed Jan. 13, 1967, Ser. No. 608,963
Int. Cl. C08f *47/08;* C08g *9/24;* C08j *1/16*
U.S. Cl. 260—2.5                                    12 Claims

ABSTRACT OF THE DISCLOSURE

This invention relates to novel acrylic foams having high resilience properties that enables the foam to recover rapidly from depression. The foams are produced by the foaming of a mixture of a reactive polymer latex comprising 2-($\omega$-alkenyl)-guanamines having a terminal group $CH_2=C<$ which is in an unconjugated relationship to the unsaturation of the triazine ring, such as 4-pentenoguanamine with a polyfunctional reagent, such as a melamine-formaldehyde condensate. The foams of this invention are capable of incipient gelatinization so that the foam gels rapidly during the drying and curing process. The unconjugation of the terminal double bond of the alkenyl group permits the guanamines to become an integral part of the polymer; whereas substituents on the triazine ring having their terminal unsaturation in conjugated relation to the triazine unsaturation fail to copolymerize with other monoethylenically unsaturated monomers because of the coagulation of the initial charge of the monomer mixture during polymerization. The reactive groups in the polymer may react with each other before the latex is mixed with the polyfunctional reagent to cause internal cross-linking and thereby set up or gel the polymeric mass, or they may react with the polyfunctional reagent to set up or gel the polymeric mass after foaming. The products of this invention may be used wherever high resilience is the desired characteristic for a foamed product such as, for example, in carpet backing material, draperies and cosmetic apparel.

This invention relates to novel foamed products and processes for making them. The foamed products are produced by the foaming of a mixture of a reactive polymer latex and a polyfunctional reagent. More particularly, foamed products having an exceptionally high degree of resilience are prepared from an initial material comprising vinyl or acrylic copolymers integrally containing certain reactive groups within the polymer.

Resilience is a highly desirable characteristic in a foamed product, especially when the foam is used for cushioning material, carpet backing, or any other application where shape-retaining properties are essential. Heretofore, foamed products formed from polymers comprising a substantial amount of acrylic compounds have not possessed this desired resilient characteristic.

The prior art does disclose processes for preparing foamed products from an initial reactive polymer latex starting material. However, none of the products of these processes possess the high degree of resilience as the foamed polyacrylic products of this invention. For example, U.S. Pat. 3,215,647 discloses the production of a foam from an aqueous dispersion of polymer containing reactive functional monomers mixed with a coreactive cross-linking material. More particularly, it discloses the foaming of a mixture of a latex comprising a copolymer of styrene and/or acrylic monomers and a coreactive material, such as a melamine-formaldehyde resin. However, a polymer latex comprising a polymer having a predominantly acrylic backbone; for example, more than 80% by weight of ethyl acrylate, copolymerized with about 4% by weight of a 1:1 molar mixture of acrylamide and methylol acrylamide possesses no unusual resilient characteristics when foamed according to the process of U.S. 3,215,647. This will be discussed more fully hereinafter.

U.S. patent application Ser. No. 350,676 now abandoned assigned to a common assignee discloses acrylic polymers containing reactive groups with or without an external crosslinker. However, the foamed products disclosed therein exhibit the same degree of resiliency that is normally expected with acrylic-type foams.

It is an object of this invention to provide a vinyl or acrylic foamed product having exceptional resilience and rapid recovery from deformation. It is another object of this invention to provide a foamed product comprising a polymeric mass in a durable crosslinked condition wherein it is resistant to laundering and to organic solvents used in drycleaning and in various industrial applications. It is still another object of this invention to provide foamed products that will not discolor, collapse or disintegrate even after repeated washings. It is still another object of this invention to provide foamed products having improved shape retaining properties.

In accordance with this invention the above objects are accomplished by foaming a polymer latex formed from a monomeric mixture comprising 2-($\omega$-alkenyl)-guanamines having a terminal group $CH_2=C<$ which is in an unconjugated relationship to the unsaturation of the triazine ring mixed with a polyfunctional reagent. The polyfunctional reagent reacts with some or all of the reactive groups of the polymer that are introduced by the 2-($\omega$-alkenyl)-guanamines. The unconjugation of the terminal double bond of the alkenyl group permits the guanamines to become an integral part of the polymer; whereas substituents on the triazine ring having their terminal unsaturation in conjugated relation to the triazine unsaturation fail to copolymerize with other monoethylenically unsaturated monomers because of the coagulation of the initial charge of the monomer mixture during polymerization.

The reactive groups in the polymer may react with the polyfunctional reagent to set up or gel the polymeric mass after foaming, or they may react with each other to cause preliminary internal crosslinking before they react with the polyfunctional reagent. An example of the latter instance is the situation in which the reactive hydrogen attached to the pendant nitrogens of the triazine ring are replaced either partially or wholly by methylol groups.

It has been unexpectedly discovered that the foamed products of this invention formed by foaming a mixture of a reactive polymer latex having certain reactive groups with a coreactive material possesses more resilience than foamed products obtained by methods of the prior art.

It is not known exactly why the foamed product of this invention possess their remarkable resilient characteristic. It is believed that a contributing factor is the location of the reactive sites on the pendant nitrogens of the triazine ring with respect to their distance from the unconjugated terminal unsaturation of the -alkenyl substituent connected to the triazine ring. This invention, of course, is not limited to any theory or mode of operation.

The polymeric mass of this invention is formed of an addition polymer of ethylenically unsaturated compounds comprising reactive groups by which the partially thermoplastic polymer is crosslinked. The reactive groups may be of a single type which is self-crosslinking or there may be used two or more different but coreactive groups. In addition, the polymeric mass may be the product of reaction of the reactive groups of an addition polymer of initially thermoplastic character with a polyfunctional reactant included in the composition which is formed into the foamed mass. Regardless of the particular manner in which the crosslinked or reticular structure is formed in the foamed masses of the present invention, they are essentially of integral nature.

The monomeric reactive group containing compounds of the present invention are not only more stable, especially with respect to basic materials, but also do not undergo the Michael reaction with monomeric alcohols and amines; in addition, mixtures, such as of ethyl acrylate, containing more than one mole percent of one of the guanamines used in making the products of the present invention can be emulsion-copolymerized without coagulation difficulties. Hence, the compounds of the present invention are capable of producing a wider variety of copolymers for use with polyfunctional reagents to provide foamed products with greater versatility in terms of chemical and physical properties.

The monomeric reactive group containing compounds used in making the products of this invention include those of the formula

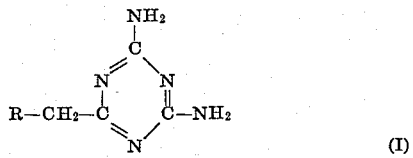

(I)

wherein R is an alkenyl group having 3 to 9 carbon atoms and a terminal group $H_2C=C<$. In other terms, the group R is an alkenyl group of the formula $—C_nH_{2n-1}$ in which $n$ has a value of 3 to 9, which alkenyl group has a terminal group $H_2C=C<$.

The preparation of the monomeric reactive group containing compounds of the present invention is disclosed in U.S. patent application Ser. No. 455,613 filed May 13, 1965, now Pat. No. 3,446,777, assigned to a common assignee.

Besides the compounds of Formula I containing two unsubstituted $NH_2$ groups, the present invention embraces the use of methylolation products, obtainable therefrom by reaction at a pH of 1 to 11, preferably 6 to 9, with formaldehyde or any source thereof, such as paraformaldehyde, trioxymethylene and paraldehyde. The methylolation may introduce from one to four methylol groups on one or both of these amine groups of the compounds of Formula I. Since some of the molecules in such a methylolation product may have a different degree of substitution of the methylol group than others, the extent of substitution may in most instances be referred to as an "average" of about 1 to 4. Related "alkylolation" products obtained by similar reaction of a compound (I) with other aldehydes, such as acetaldehyde, butyraldehyde, and benzaldehyde, are also included, but the methylolated products are preferred.

The present invention also embraces use of the N-alkoxymethyl products obtained by partial to complete alkylation of the N-methylol groups of the just-described methylolation products obtained by reaction of the aldehyde, especially formaldehyde, with the compound of Formula I in an acidic medium containing a saturated alcohol having from 1 to 8 carbon atoms, and preferably 1 to 4 carbon atoms. Alternatively, the alkylolation product, especially the methylolation product is reacted in a medium having a pH of 1 to 6.5 with a $(C_1–C_8)$-alcohol.

The methylolation (or methylolation and alkylation) of any of the compounds of Formula I can be carried out essentially in the same way as methylolation (or methylolation and alkylation) of melamine has been effected heretofore. U.S. Pat. 2,197,357 discloses typical procedures that can be used.

It is to be understood that any other heretofore known procedure may be used to effect the methylolation or the methylolation and alkylation of the compounds of Formula I or their polymers.

The following Formula II is a general formula for the most important monomeric reactive group containing compounds used in making the foamed products of this present invention:

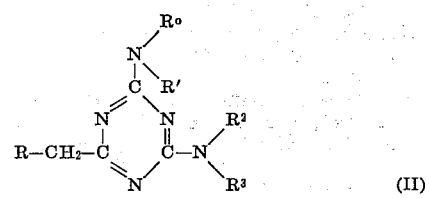

(II)

wherein

R is as defined hereinabove, $R°$ is selected from the group consisting of H, $CH_2OH$, and $CH_2OR''$ wherein $R''$ is the hydrocarbon residue of a saturated alcohol $R''OH$ having 1 to 8 carbon atoms, $R'$ is selected from the group consisting of H, $CH_2OH$, and $CH_2OR''$, $R^2$ is selected from the group consisting of H, $CH_2OH$, and $CH_2OR''$, and $R^3$ is selected from the group consisting of H, $CH_2OH$, and $CH_2OR''$.

Preferred comonomers for making the copolymers of the present invention that constitute the initial material from which the foamed mass is made include acrylic acid, methacrylic acid, the nitriles thereof, the esters thereof with a saturated aliphatic alcohol having 1 to 18 carbon atoms, acrylamide, methacrylamide, the N-methylol derivatives of these amides, itaconic acid, vinyl acetate, vinyl chloride, vinylidene chloride, and vinylaromatic hydrocarbons, especially styrene, o-, m-, and p-vinyltoluene.

The copolymers may contain from about 0.5 to about 8% by weight of at least one compound of Formula II with the balance of at least one other copolymerizable ethylenically unsaturated comonomer; a range of 3.5 to 5.0% by weight of at least one compound of Formula II is preferred. Generally, preferred copolymers are of linear type in which the monomers from which they are made consist essentially of a monoethylenically unsaturated monomer having a terminal group, $H_2C=C<$. However, for some purposes, polyethylenically unsaturated comonomers may be used in amounts from about 0.1% to 20% or more by weight, based on the entire weight of monomers. Small amounts, such as 0.1 to 0.8% or 1% of such comonomers serve to increase the molecular weight without extensive crosslinking and gelation.

Some additional monomers copolymerizable with 2-(ω-alkenyl)-guanamines may be one or more of the following monomers: ethylene, propylene, isobutylene, vinylaromatic compounds, such as styrene, vinyltoluene, vinyl esters of saturated aliphatic acids having 1 to 18 carbon atoms, such as vinyl acetate, vinyl laurate, vinyl stearate, acrylic acid esters and methacrylic acid esters of a saturated aliphatic alcohol having 1 to 18 carbon atoms, acrylonitrile, methacrylonitrile, vinyl fluoride, vinylidene chloride, vinylidene fluoride and vinylidene chlorofluoride.

Preferred copolymers are those of at least one $(C_1–C_4)$-alkyl acrylate and 0.5 to 8 weight percent of a 2-(ω-alkenyl)-guanamine.

More particularly, the preferred compositions of the reactive polymer latices, that constitute the initial material from which the foamed mass is made, are derived from the polymerization of at least one ethylenically unsaturated compound having a group $CH_2=C<$ and 0.5 to 8 weight percent of 4-pentenoguanamine or its methylolated analogue.

As described supra, an external polyfunctional reactant is mixed with the reactive polymer latex to provide additional crosslinking action needed for setting or curing the foamed composition in heat resistant and solvent-resistant condition. Examples of such reactants include polyols, polybasic carboxylic acids, polybasic carboxylic acid amides, polyamines, aldehydes including monoaldehydes which in reaction serve as polyfunctional agents, such as formaldehyde and acetaldehyde, and dialdehydes, such as glyoxal, also resin-forming poly(vic-epoxides) and the condensation products of an aldehyde with a phenol, urea, isophthalamide, thiourea, N,N'-ethyleneurea, an aminotriazine, such as melamine, benzoguanamine, N,N-dimethylmelamine, or a triazone of the formula

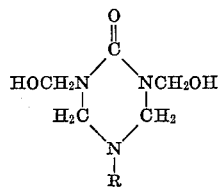

wherein R is selected from the group consisting of alkyl groups having 1 to 4 carbon atoms and hydroxyalkyl groups having 1 to 4 carbon atoms.

Among the various polyfunctional reactants, those having at least two reactive groups are generally preferred.

Examples of diols include glycol, diethylene glycol, butylene glycol. Other polyols that can be used include triethanol propane and pentaerythritol. Examples of the polybasic acids include o-phthalic, terephthalic, isophthalic, adipic, sebacic, maleic and succinic acids. Examples of the polyamides include adipamide, succinamide, and sebacamide. Examples of the polyamines include ethylene diamine, propylene diamine, hexamethylene diamine, and the polyalkylenepolyamines, such as diethylenetriamine and triethylenetetramine.

Reaction between aldehydic reactants and a polymer latex polymerized from a monomeric mixture comprising an unsaturated guanamine can be effected under the conditions described in copending patent application Ser. No. 455,613 now Pat. No. 3,446,777 assigned to a common assignee.

In general, the reactive group or groups in the polymer is or are chosen to assure incipient gelatinization of the polymer in the system under the conditions at which foaming is induced so that interruption of an essential condition, e.g. of heating or agitation, or of introduction of blowing gas by other means, does not cause collapse of the foam. The incipient gelatinization serves to maintain the formed mass in foamed condition while completion of drying and curing goes on in an essentially quiescent state. In other words, the reaction of the reactive group with itself (in the case of the N-methylolated reactive functionalities), with other reactive groups in the polymer, or with an external polyfunctional reactant, as hereinbefore described, should be sufficiently rapid to provide the necessary incipient gelatinization to stabilize the foamed mass during the completion of this drying action.

By suitable choice of monomer in the making of the polymeric material, the foamed product may have any of a wide range of properties from a soft and flexible product to a hard and rigid product. In general, the softness and flexibility increases as the content of alkyl acrylate in which the alkyl group has 2 to 18 carbon atoms or of alkyl methacrylate in which the alkyl group has 5 to 18 carbon atoms increases. On the other hand, hardness and rigidity are enhanced by increase of lower methacrylate, such as methyl methacrylate, and other monomers such as vinyl chloride, vinyl acetate, acrylonitrile, styrene, and vinyltoluene. Increasing the quantity of crosslinked units in the final product may also be relied on to increase hardness and/or rigidity.

Any of the conventional ways of producing foamed products either of open-cell or closed-cell structure from such polymeric materials may be employed. For example, the vinyl or acrylic polymer polymerized from a monomeric mixture comprising from 0.5 to 8 weight percent of a 2-(ω-alkenyl)-guanamine with a polyfunctional reactant, with or without a catalyst for effecting cross-linking, and with or without a plasticizer may be introduced into a chamber wherein it may be subjected to a gas under pressure and heated to fuse or coalesce the film-forming polymeric material. Upon sudden release of the gas, the mass sets into an open-cell sponge-like product.

Another procedure involves the mixing of a gas-generating substance and the polymeric material and then subjecting the mixture which may also contain a plasticizer for the polymeric material, if desired, to conditions which liberate the gas such as heat, change of pH to either the acid or the alkaline side, and so forth. Examples of gas-generating substances include bicarbonates of sodium, potassium, calcium, bismuth, and other metals, metallic oxalates and formates, such as calcium oxalate, and sodium formate, and diazo compounds, such as amino-diazobenzene. Other useful blowing agents are the ammonium compounds such as ammonium carbonate, ammonium bicarbonate, ammonium benzoate, ammonium nitrate, and ammonium sulfite, the nitric and nitrous acid salts, such as calcium nitrate and barium nitrite, and various metallic carbamates. Others are diphenyl-4,4'-di(sulfonyl azide) and certain lower t-alkyl ammonium nitrites, such as t-butyl-, t-octyl-, t-amyl-, and t-nonyl-ammonium nitrite.

Another procedure is to mix the polymeric material, with or without a polyfunctional reactant, with or without a catalyst for effecting crosslinking, and with or without a plasticizer for the polymeric material, and a particulate or granular solid which is soluble in a solvent which does not attack the polymeric material. Most advantageously water-soluble solids are used such as common salt, sugar, or sodium sulfate, which are readily soluble in water. The mixture contains a sufficiently large proportion of the soluble solid to provide intercommunicating cells upon dissolution of the solid after coalescence and gelation or setting of the polymeric material such as by heat.

A preferred procedure involves the foaming of the polymeric material by means of suitable wetting or foaming agents with agitation of such foamed mass and gelation or setting of the foamed mixture in foamed condition while exposed to the atmosphere. Suitable foaming agents include alkali metal dialkyl sulfosuccinates in which each alkyl group has between four and twenty-four carbon atoms. The dibutyl, dihexyl, and dioctyl sodium sulfosuccinates and octadecyl disodium sulfosuccinamate are suitable for use in producing low density foams. Another satisfactory group of foam-increasing agents are the alkali metal alkylaryl sulfates and sulfonates wherein there is present an alkyl group having from four to thirty carbon atoms. Examples of this group are dodecyl benzene sodium sulfonate, octyl naphthalene sodium sulfonate, dodecyl benzene ethanolamine sulfonate, monobutylphenyl-phenol sodium monosulfonate, monobutyl biphenyl sodium sulfonate, and the sodium salt of sulfated octoic acid ester of naphthol. Alkylaryl polyether alcohols and alkylaryl polyether sulfonates in which the alkyl group has from eight to twenty-four carbon atoms may be used. Examples of this group are the octadecyl phenol ethylene oxide condensation product and the polymer of such product, the sodium salt of dodecyl phenol ethylene oxide, and the sodium salt of decyl phenol ethylene oxide sulfate. The manufacture of members of this group of compounds is disclosed in detail in U.S. Pats. 2,454,541, -2, -3, -4. The alkali metal or amine soaps of fatty acids having from twelve to twenty-four carbon atoms may be employed in preparing the composition. Examples of such soaps are sodium stearate, potassium oleate, triethanolamine, palmitate, aminoethanolamine oleate, and ammonium laurate. The sorbitan esters of acids having from twelve to twenty-four carbon atoms are suitable surface-active agents. Examples thereof are sorbitan monolaurate and sorbitan trioleate. Another group of foam-increasing agents comprises the polyoxyalkylene sorbitan esters of acids containing from twelve to twenty-four carbon atoms. Examples of these compounds are polyoxyethylene sorbitan monolaurate, polyoxyethylene sorbitan tristearate, polyoxyethylene sorbitol monolaurate, and polyoxyethylene sorbitol pentaoleate. The alkyl and alkaryl quaternary ammonium halide compounds wherein at least one alkyl group of the former has from eight to twenty-four carbon atoms and at least one alkaryl group in the latter totals from eight to twenty-four carbon atoms are suitable for use in the composition. Examples of such quaternary ammonium compounds are cetyl dimethyl benzyl ammonium chloride, octadecyl dimethyl benzyl ammonium chloride, octadecanol-9 - dimethyl ethyl ammonium bromide and diisobutyl phenoxyethoxy ethyl dimethyl benzyl ammonium chloride. Another excellent group of foaming agents comprises the alkyl sulfates and sulfonates wherein the alkyl groups have from eight to thirty carbon atoms. Examples thereof are lauryl sodium sulfate, octadecanol sodium sulfate, octyl alcohol potassium sulfate, lauryl methanol sulfonate, and sodium petroleum sulfonate. The sulfated and sulfonated alkyl amines and amides wherein there is at least one alkyl group having from eight to twenty-four carbon atoms have been employed with success. Examples of this group are triethanolamine oleate sulfate, butyl amine salt of dodecyl benzene sulfonic acid, and the sodium salt of the sulfonated reaction product of oleyl chloride and methyl taurine, having the formula

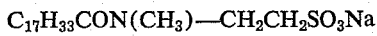

$$C_{17}H_{33}CON(CH_3)-CH_2CH_2SO_3Na$$

In one general embodiment of the preferred procedure just described, the polymeric material is in the form of an aqueous dispersion (i.e. latex) obtainable by emulsion polymerization and has a solids concentration of about 35 to about 60%, preferably 45 to 55%, at the foaming stage. If the dispersion is prepared using emulsifiers having good frothing or foaming capacities under agitation, there may be no need to add additional foaming agents. However, it is frequently desirable to add a foaming agent, such as any of those mentioned hereinabove. The total amount of foaming agent present in the composition may be from about 0.5 to 10% by weight based on the weight of addition polymer in the composition, though for most purposes, the preferred range is generally from about 1 to 3%.

Instead of introducing air by foaming or blowing other inert gases, such as carbon dioxide, nitrogen, nitrogen oxides, helium or the like, may be used.

The composition to be foamed in the preferred fashion may also include a thickener, which is a hydrophilic polymeric colloid, in an amount up to about 6% by weight, based on the weight of the liquid portion of the composition. The polymeric material itself may contain hydrophilic groups, such as carboxyl or hydroxyl in sufficient quantity to so modify the rheology of the latex that the addition of a separate thickener may be unnecessary. However, it is generally the case that the duration or stability of the foamed condition on ceasing of agitation is improved by the addition of a separate thickener in an amount of about 0.05 to 2% by weight of the aqueous portion of the composition. In addition, the polyfunctional reactant may have qualities which serve to thicken the composition and stabilize the foamed condition on ceasing of agitation. This is particularly true of formaldehyde condensates, such as a 4-pentoguanamine, urea or melamine, which have been partially condensed to a condition approaching but not attaining the limit of water-solubility. The use of a plurality of foaming agents is also in many instances an effective expedient to enhance foam stability or durability on ceasing of agitation. Frequently, it has been found that the employment of a foaming agent having only moderate foaming capability in conjunction with another highly effective foaming agent in appropriate relative proportions serves to enhance the stability of the foam without appreciably diminishing the foaming capacity of the more efficient agent in the mixture. Such mixtures may consist of two or more different agents of the same ionic character; namely, anionic, cationic, or non-ionic, or they may consist of two or more different agents of different ionic nature; e.g., a mixture of at least one foaming agent having a non-ionic nature with at least one other having anionic or with another having cationic nature or in some instances with an agent of anionic and another of cationic nature.

In the preferred procedure, the aqueous dispersion of the polymer and foaming agent or agents, with or without a plasticizer, with or without a separate polyfunctional reagent, and with or without a thickener, having a solids concentration of about 35 to 60% by weight is placed in a suitable container having adequate space for the foam to be produced under conditions favoring the reaction to crosslink the polymer. The conditions include a temperature as low as room temperature or even lower. The mass may be heated to facilitate crosslinking with certain external crosslinkers, or to achieve efficiency with certain foam stabilizers. The degree of heating should be short of that causing degradation of the polymer. The composition is agitated vigorously to develop the foamed condition. The temperature may be predetermined before or after or simultaneously with the start of agitation. If the polymeric material or mixture thereof with the polyfunctional reagent reacts to form crosslinks and to set the material merely on heating, the agitation must be started early enough in the process to assure full development of the desired foamed condition before the heating sets or cures the material in untractable condition. The agitation is stopped when the predetermined extent of foaming is reached and the heating is continued to set the material in the foamed condition thus attained. If desired, a catalyst for the reaction of the polymer and/or the polyfunctional reactant may be stirred into the foamed mass shortly before stopping the agitation. After the agitation is stopped, the foamed material may be allowed to set in the container in which it is formed, the agitating device having been removed, or it may be poured onto a substrate that is to be coated with the foamed material, the setting being completed after the pouring, as by heat within, or applied to, the substrate or by prolonged storage in the ambient atmosphere. The substrate to which the foam is thus applied may serve as a permanent support as in the formation of laminar articles of which at least one layer is the foam, or the substrate may simply serve as a temporary support in the making of self-supporting sheets or blocks of the foamed material which are stripped from the substrate after being adequately set or cured.

The product may be of the closed cell type or of the open cell or intercommunicating cell type depending on the method employed for making the product. Of course, in the products of closed cell type, there may be present an appreciable number of open cells and the converse is true in the case of the open cell foamed product. Both types are useful, though for some purposes one type may be more suitable than the other. For example, the closed cell type is generally preferable for insulating purposes and when flexible for cushioning. On the other hand, the open cell type is preferable for use when absorption of a liquid or adsorption of a gas is intended. For example, the flexible, intercommunicating-cell type of product is quite useful for cleaning and scrubbing purposes, and for insulation of garments.

Regardless of which method is resorted to for forming the foamed product a plasticizer for the polymeric material may be present, particularly if the polymer is incapable of forming a continuous film at the highest temperature used in the foam-forming operation. In such event, sufficient plasticizer is included in the composition to assure the proper coalescence or fusing of the polymeric material during the operation. In many instances, no plasticizer is needed or desired, but when used, it may be present in an amount up to about 60% by weight of the polymeric material. The conventional plasticizers for the particular type of polymeric material may be used and they may be of the most common low molecular weight type or they may be of polymeric type, such as the alkyd resins.

Dyes, pigments, inert filler materials, perfumes, cosmetics, drugs, antiseptics, bactericides, detergents, ion-exchange resin particles, and other materials may be included within the polymeric material composition prior to the foaming operation. Alternatively, such materials may be incorporated into the composition during or after the foaming operation. Such adjuvants or additives may be introduced for various purposes such as to incorporate an additional functional agent within the body of the cellular mass or to modify the absorptive properties thereof. For example, such hydrophilic materials as fibers or filaments of cotton, α-cellulose derived from wood pulp, and rayon either of viscose or cuprammonium cellulose derivation may be introduced to increase the softness and absorptive capacity or to increase the tensile strength of the matrix. The ion-exchange material may serve as a repository of plant-nutrients.

The products can be made directly in the foam ultimately desired; alternatively, they may be formed in larger masses and then cut to the desired size and shape. The formation may be effected in stationary molds or continuously such as by extrusion to form rods, tubes, or slabs. They may be cast upon various substrates to form laminar products or coated products. The cellular products of the present invention may have a wide range of density starting as low as 1 pound per cubic foot. Low density products having weights of 1 to 15 pounds per cubic foot, and preferably from 2 to 4 pounds per cubic foot, are extremely desirable. In other terms, the range of density may be expressed in terms of void space in the mass. Thus the products may comprise from 5% to 98% void space or volume, and preferably have at least 50% void space.

The cellular products may be employed as expandable or disposable articles wherein they are discarded after serving one use. The cellular products of the present invention are useful as surgical dressings, sanitary napkins, tampons, and catamenial pads. They also serve as deodorant pads, dress shields, and the like. For all of these uses which may be broadly termed sanitary uses, they may be initially formed in the proper shape or they may be cut to shape from a larger mass thereof. In such cases which involve absorbency, it is generally preferable to have the polymeric mass formed of an at least partially hydrophilic material. The use of cellulose fiber fillers is also advisable to increase softness and absorbency. The product may be employed as a filler in a surgical dressing, catamenial pad, or the like, in which it may be disposed within a sheath of gauze or other protective material. The foamed products of this invention may also be used in brassieres, as cushioning under upholstery fabric, as drapery backing material and under floor covering. The cellular products of the present invention may be formed into thin sheets which may be fashioned into suitable form to serve as the lining in clothing, particularly for the purpose of protection of the body of the wearer against exposure to toxic gases or vapors which may be present in the air in emergency situations such as may at times occur in chemical factories, fires, or chemical warfare.

To assist those skilled in the art to practice the present invention, the following modes of operation are suggested by way of illustration, parts and percentages being by weight and the temperatures in degrees centigrade unless otherwise specifically noted.

(1A) A mixture of 215 gms. 10-undecenonitrile, 110 gms. dicyandiamide, 30 gms. of 50% choline in methanol and 500 gms. methyl Cellosolve are heated to reflux for about 22 hours. The reaction mixture is cooled to about room temperature and filtered. The filtrate is evaporated and the residue obtained is recrystallized from a methanol-water mixture to provide about 66 gms. 10-undecenoguanamine, a white crystalline solid having a melting range of 100–129° C.

(1B) A mixture of about 13 gms. 10-undecenoguanamine, prepared in procedure (1A) above, about 207 gms. ethylacrylate, about 26 gms. formaldehyde (37% solution), about 15 gms. isooctylphenoxypolyethyleneglycol ether (having 40 ethyleneglycol units), about 0.5 gm. sodium acetate and about 566 gms. deionized water is sparged with nitrogen. Polymerization of the mixture is initiated at about 15° C. by the addition of about 15 gms. isoascorbic acid (3.33% solution), about 1.5 ml. ferrous sulfate (0.18% solution) and about 0.12 gm. t-butyl hydroperoxide (70% solution). To the reaction mixture, maintained at about 54° C., is added a mixture of about 498 gms. ethyl acrylate, 32 gms. 10-undecenoguanamine, about 64 gms. formaldehyde (37% solution), about 38 gms. isooctylphenoxypolyethyleneglycol ether (having 40 ethyleneglycol units), about 2 gms. sodium lauryl sulfate (27% solution), about 1 gm. sodium acetate, about 1 gm. isoascorbic acid, about 267 gms. deionized water and about 1 gm. t-butyl hydroperoxide (70% solution). Polymerization is continued until complete and the latex is cooled to about room temperature. The latex exhibits a pH of about 5.4 and a solids content of about 44%.

(1C) To 100 parts by weight of the latex prepared in procedure (1B) above is added 7 parts by weight trimethoxymethyl melamine (70% solution in water), about 0.3 part methylcellulose, 7 parts by weight t-octylphenoxyethoxy sulfonate (30% solution in water), about 3.5 parts by weight t-octyl phenoxy polyethanol (16 ethylene oxide units). The mixture is placed in an open receptacle and mechanically whipped with a high speed agitator to a foamed condition. About 2.8 parts by weight hydrochloric acid (18% aqueous) is slowly added to the foamable mixture during the high speed agitation. The agitation is continued until foaming is completed to provide a white moderately soft unusually resilient foam. The foam is cast to a thickness of about ⅛″ on silicone-coated release paper. The ⅛″ foam strip is laminated to a cotton fabric and the laminate is dried and cured for about 10 minutes at about 140° C. The laminate exhibits unusual durability even after several laundering cycles with "Tide" a common household detergent, each cycle being for a period of about 20 minutes at about 60° C.

(2A) To about 19 gms. of a mixture of choline in methanol (50%) is added about 136 gms. 4-pentenonitrile, about 134 gms. dicyandiamide and about 104 gms. n-butanol and the mixture is heated for about 8 hours at about 90° C. The mixture is cooled to about room temperature and centrifuged to provide about 220 gms. of white crystalline 4-pentenoguanamine having a melting range of 192–195° C.

(2B) To a mixture of about 42 gms. 4-pentenoguanamine and about 46 gms. formaldehyde (37%) is added a sufficient amount of 20% aqueous sodium hydroxide to bring the pH of the mixture to about 8.5. The reaction mixture is heated at 70° C. for about 15 minutes. The reaction product is then cooled to about room temperature and concentrated using a conventional evaporation technique. The concentrated oil is then added to about 250 ml. methanol and cooled to about room temperature to crystallize the product. Recrystallization from methanol provides about 90 gms. of N,N'-dimethylol-4-pentenoguanamine having a melting point of about 78–80° C.

(2C) A mixture of about 90 gms. N,N'-dimethylol-4-pentenoguanamine, 50 mls. butyl alcohol and about 2.5 mls. concentrated hydrochloric acid is heated at about 80° C. for about 4 hours. The reaction product is concentrated using conventional evaporation techniques and the residue is recrystallized in about 250 mls. methanol to provide N,N'-dibutoxymethyl-4-pentenoguanamine having a melting point of about 78–80° C. To a mixture of about 48 gms. N,N'-dibutoxymethyl-4-pentenoguanamine about 277 gms. butyl acrylate and about 277 gms. methyl methacrylate is added a mixture of about 70 gms. isootcylphenoxypolyethyleneglycol sulfonate (having three ethyleneglycol units), and about 600 gms. deionized water. The mixture is sparged with nitrogen and about 1.5 gms. potassium persulfate and 4.5 gms. trimethylamine (25% solution) are added to the reaction mixture and the contents of the reaction vessel are heated to a refluxing condition to initiate polymerization. Refluxing is continued for about two hours and the reaction mixture is cooled to about 85° C. The temperature is maintained at about 85° C. until the polymerization is completed to provide a latex having a solids content of about 41%.

(2D) A mixture of 100 parts by weight of the latex prepared in procedure (2C) above, 6 parts sodium lauryl sulfate (27%), 6 parts permethoxymethyl melamine, 1.5 parts of an equimolar mixture of myristyl and lauryl alcohol, 1.5 parts isooctylphenoxypolyethyleneglycol ether (containing about 70 glycol units), 2 parts butanol, 0.15 part methylcellulose and 10 parts ground cotton particles is placed in an open container and mechanically whipped to a foamed condition with a high speed agitator then about 1.6 gms. of ground oxalic acid is added to the foamable mixture and sitrring is continued for about 2–4 minutes, to provide a relatively soft resilient foam.

The foam obtained is cast on silicone release paper to a thickness of about ⅛". The ⅛" foam strip is sandwiched between a cotton fabric backing material and a light acetate tricot fabric to form a laminate. The laminate is dried and cured at a temperature of about 165° C. for about 11 minutes. The laminate exhibits very good resistance to repeated washings using common household cleansing agents.

(3) A mixture of 100 parts by weight of the latex prepared in procedure (2C) above, 6 parts sodium lauryl sulfate (27%), 6 parts permethoxymethyl melamine, 1.5 parts of a 1:1 mixture of myristyl alcohol and lauryl alcohol, 1.5 parts isooctylphenoxypolyethyleneglycol ether (having 70 ethylene glycol units), 2 parts butanol, 0.15 part methylcellulose and 10 parts titanium dioxide is placed in an open container and mechanically whipped to a foamed condition with a high speed agitator and cooled to about 15° C. then about 1.6 gms. of ground oxalic acid is added to the foamable mixture and stirring is continued for about 2–4 minutes, to provide a relatively soft resilient foam.

(4A) To a mixture of formaldehyde and water is added about 32 gms. 4-pentenoguanamine. The mixture is heated at about 70° C. for about 15 minutes until a clear mixture is obtained to provide about 300 gms. of a solution of N,N'-dimethylol-4-pentenoguanamine.

(4B) To a mixture of about 300 gms. of the product prepared in procedure (4A) above, about 688 gms. ethylacrylate, about 80 gms. acrylonitrile, about 2 gms. sodium acetate and about 500 gms. deionized water is added about 50 mls. sodium persulfate (8% solution), about 4 gms. sodium lauryl sulfate, about 60 gms. octylphenoxypolyethyleneglycol (having 70 ethyleneglycol units) and the resulting mixture is heated to about 80° C. for about 2 hours until polymerization is completed. The latex is then cooled to about room temperature to provide a solids content of about 48% and a pH of about 5.5.

(4C) To about 6.7 gms. of a mixture consisting of about 1.7 gms. myristyl alcohol, about 1.7 gms. Cellosolve, and about 3 gms. of 70% solution of isooctylphenoxypolyethylene glycol ether (having about 40 ethyleneglycol units) is added about 100 gms. of the latex prepared in procedure (4B) above, about 6 gms. sodium lauryl sulfate (27%) and about 2 gms. oxalic acid. To this mixture is added about 0.1 gm. hydroxyethyl-cellulose and about 7 gms. methyloltrimethoxymethyl melamine and the resulting mixture is placed in an open container and mechanically whipped to a foamed condition with a high speed agitator. The resulting foam is moderately soft, unusually resilient and has a density of about 16 gms./100 ml. and a pH of about 3. The resulting foam may be cast in ridges on the backing of a flocked carpet. It may also be used as a cushion backing material, such as for bathroom mats and dining placemats. A laminate is formed in the same way as described in procedure (3) above. The laminate possesses the same durable characteristics when subjected to repeated launderings using conventional household cleaning agents. Since the foam products are durable to repeated launderings, they are suitable for use in articles of clothing, such as padding and also for cosmetic purposes, such as for brassieres and the like.

(4D) A foam is prepared in the same way as in procedure (4C) above except an equimolar mixture of acrylamide and methylol acrylamide is substituted for the 4-pentenoguanamine. The resulting foam is not as resilient as the foam obtained in procedure (4C). The foam remained depressed when squeezed by the fingers for periods up to a minute, while the foam prepared in procedure (4C) exhibited immediate recovery from depression.

(5A) To a mixture of about 77 gms. acrylonitrile about 690 gms. ethylacrylate, about 300 gms. of a solution of N,N'-dimethylol-4-pentenoguanamine prepared in accordance with Example 4A is added about 1.6 gms. sodium acetate, about 57 gms. isooctylphenoxypolyethyleneglycol ether (having about 40 ethyleneglycol units), about 3 gms. sodium lauryl sulfate and about 626 gms. deionized water. The mixture is placed in a reaction vessel and sparged with nitrogen and polymerization is initiated with about 4 gms. isoascorbic acid (10% solution), 8 gms. ferrous sulfate heptahydrate (0.18% solution) and about 0.12 gm. t-butylhydroperoxide (70% solution) at a temperature of about 15° C. The reaction temperature is maintained at about 55° C. and the reaction is recatalyzed at successive 30 minute intervals with additions of about 18 gms. t-butyl hydroperoxide until the polymerization is completed. The final latex possesses a total solids content of about 44% and a pH of about 5.7.

(5B) A mixture of about 50 gms. of the latex prepared in procedure (5A) above, about 1 gm. isooctylphenoxypolyethyleneglycol ether (having 40 ethyleneglycol units), about 5 gms. of a mixture consisting of about 0.7 gm. isooctylphenoxypolyethyleneglycol ether, about 8 gms. myristyl alcohol, about .8 gm. Cellosolve and about 3 gms. sodium lauryl sulfate, about 3.4 gms. methyloltrimethoxymethyl melamine and about 2 gms. oxalic acid is placed in an open container and mechanically whipped to a foamed condition with a high speed agitator and heated to about 40° C. The resulting foam has a density of about 0.146 and a pH of about 2.8. A laminate formed in the same way as the laminate described in procedure (2) above exhibits the same durability characteristics after exposure to repeated launderings.

(5C) A latex is prepared in the same way as in procedure (5A) above except 4-pentenoguanamine is replaced with an equimolar mixture of acrylamide and methylolacrylamide. The latex thus prepared is used to form a foam in the same way as described in procedure (5B) above. The resulting foam containing the acrylamide-methylol-acrylamide component exhibits a greater degree of firmness, is less resilient and also exhibits a very slow recovery from tack. The compression set of the foam prepared according to procedure (5B) above, after heating at 70° C. for about 22 hours, is about 4% while the compression set for the foam prepared according to procedure (5C) under the same conditions is about 27%.

(6A) A latex is prepared the same way as in procedure (5A) above, except that the acrylonitrile is replaced by an equimolar amount of styrene.

(6B) A foam is prepared in the same way as procedure (5B) above, except the 3.4 gms. trimethoxymethylol melamine is replaced by about 1.5 gm. trimethoxymethylol melamine (a melamine-formaldehyde condensate).

(7) A foam is prepared in the same way as in procedure (5B) above, except the N,N'-dimethylol-4-pentenoguanamine is replaced by an equimolar mixture of acrylamide and methylol acrylamide.

Then foam prepared according to procedure (7) is less resilient than the foam prepared according to procedure (5B). The former requires only a 26 gm./sq. in. load to compress it 50% while the latter requires as much as 74 gms./sq. in. to compress it 50%.

(8A) Three groups of six lattices are prepared in the same way as the latex of procedure (5A) above. The monomer charges of each group are as follows:

GROUP 1

Latex 1 has a monomer charge of 76% by weight ethylacrylate, 20% by weight vinylidene chloride and 4% by weight 4-pentenoguanamine.

Latex 2 has a monomer charge of 76% by weight ethylacrylate, 20% by weight vinylidene chloride and 4% by weight of an equimolar mixture of acrylamide and methylolacrylamide.

GROUP 2

Latex 3 has a charge of 76% by weight ethylacrylate, 20% by weight vinyl acetate and 4% by weight 4-pentenoguanamine. The latex 4 has a charge of 76% by weight ethylacrylate, 20% by weight vinyl acetate and 4% by weight of an equimolar mixture of acrylamide and methylolacrylamide.

GROUP 3

Latex 5 has a monomer charge of 76% by weight ethylacrylate, 20% by weight styrene and 4% by weight 4-pentenoguanamine. Latex 6 has a monomer charge of 76% by weight ethylacrylate, 20% by weight styrene and 4% by weight of an equimolar mixture of acrylamide and methylolacrylamide.

(8B) Each of latices 1 through 6 are foamed in accordance with the technique described in procedure (5B) above. Each of the foams obtained have a foam wet density of about 0.164 and a pH of about 3.2. Each of the foams are tested for their resiliency characteristics. The test consists simply of pinching a ⅛" foam strip between the finger. Resiliency is measured by the amount of time required for the foam to regain its original dimensions. The foams prepared from latices 1, 3 and 5 recover immediately from the finger-pinch test, while the foams prepared from latices 2, 4 and 6 exhibit incomplete recovery from the finger-pinch tests. Each of the foams is formed into a laminate as described in procedure (2) above. The laminates are then dried and cured for about 9 minutes in an oven at about 150° C. The laminates are then tested for their durability characteristics. The durability test consists of repeated launderings using a conventional household cleaning agent as described in procedure (1) above. The laminates formed from foams 1, 3 and 5 endure respectively 40, 40 and 12 wash cycles, while the laminates formed from foams 2, 4 and 6 completely collapse, although they do not delaminate.

(9A) A latex is prepared as in procedure (5A) above from a monomer charge of 60% by weight ethylacrylate, 36% by weight methyl methacrylate and 4% by weight of N,N'-dimethylol-4-pentenoguanamine.

(9B) A mixture of 100 parts by weight of a 50% solids aqueous dispersion of an emulsion copolymer formed in procedure (9A) above, 1.5 parts lauryl alcohol, 2 parts isopropanol, 1.5 parts isooctylphenoxypolyethyleneglycol ether (having 70 ethyleneglycol units), 3 parts tartaric acid, 5 parts sodium lauryl sulfate and 7 parts dimethylolisothphalamide are placed in an open container and mechanically whipped to a foamed condition with a high speed agitator. The foam obtained has a wet density of about 0.147. Laminates prepared from the foam as in procedure (2) above exhibit exceptional resistance to repeated launderings carried out in accordance with the method of procedure (1) above.

(10A) A latex is prepared in the same way as in procedure (5A) above from a monomer charge of 75% by weight ethylacrylate, 24.2% by weight methyl methacrylate, 0.3% by weight acrylic acid and 0.5% by weight of N,N'-dimethylol-4-pentenoguanamine.

(10B) A mixture of 100 parts by weight of a 50% solids aqueous dispersion of the emulsion copolymer obtained in procedure (10A) above, 5.5 parts sodium lauryl sulfate, 1.5 parts Cellosolve, 1 part oxalic acid, 1.5 parts myristyl alcohol, 1.5 parts isooctylphenoxypolyethyleneglycol ether (having about 40 ethyleneglycol units) are placed in an open container and mechanically whipped to a foamed condition with a high speed agitator. The foam is cast into ⅛" thick strips and a laminate is formed as in procedure (2) above. The laminate is resistant to over 40 washing cycles as described in procedure (1) above. It is also resistant to over 30 dry cleaning cycles, each of about 20 minutes duration using perchloroethylene as the solvent.

(10C) A foam is prepared in the same way as procedure (10B) above, except 10 parts nylon flock is added to the foamable mixture. The resulting foam is not as soft as the foam obtained in procedure (10B), however, it is still quite flexible and very resilient. It exhibits rapid recovery from compression. Foams of this nature are especially useful for lamination of light fabrics.

What is claimed is:

1. As an article of manufacture, a cellular product having at least 5% of its volume in the form of voids, formed from a polymer material comprising a copolymer of copolymerizable ethylenically unsaturated molecules comprising from about 0.5% to about 8%, based on the total weight of the monomers, of a compound of the formula

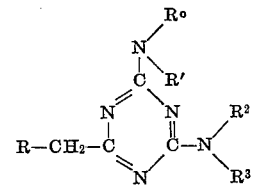

wherein
R is an alkenyl group having 3 to 9 carbon atoms and having a terminal group of the formula $H_2C{=}C{<}$,
$R^o$ is selected from the group consisting of H, $CH_2OH$, and $CH_2OR''$ wherein $R''$ is the hydrocarbon residue of a saturated alcohol $R''OH$ having 1 to 8 carbon atoms,
$R'$ is selected from the group consisting of H, $CH_2OH$, and $CH_2OR''$,
$R^2$ is selected from the group consisting of H, $CH_2OH$, and $CH_2OR''$,
$R^3$ is selected from the group consisting of H, $CH_2OH$, and $CH_2OR''$, with the proviso that when all of groups $R^o$, $R'$, $R^2$, and $R^3$ are hydrogen, a polyfunctional reagent reactive with the $R^o$, and $R'$, $R^2$, and $R^3$ groups is mixed with the polymer latex.

2. As an article of manufacture, a cellular product having at least 5% of its volume in the form of voids, formed of a polymeric material comprising a copolymer of a mixture of copolymerizable ethylenically unsaturated molecules comprising between about 0.5% and 8% by weight, based on the total weight of said molecules, of a compound of the formula

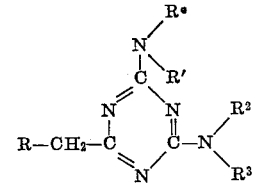

wherein
R is an alkenyl group having 3 to 9 carbon atoms and a terminal group of the formula $H_2C=C<$,
R° is selected from the group consisting of H, $CH_2OH$, and $CH_2OR''$ wherein R'' is the hydrocarbon residue of a saturated alcohol R''OH having 1 to 8 carbon atoms,
R' is selected from the group consisting of H, $CH_2OH$, and $CH_2OR''$,
$R^2$ is selected from the group consisting of H, $CH_2OH$, and $CH_2OR''$, and
$R^3$ is selected from the group consisting of H, $CH_2OH$, and $CH_2OR''$.

3. As an article of manufacture, a cellular product having at least 5% of its volume in the form of voids, formed of a polymer material containing a copolymerized mixture of at least one ethylenically unsaturated monomer and between about 0.5% and 5% by weight of 4-pentenoguanamine.

4. As an article of manufacture, a cellular product having at least 5% of its volume in the form of voids, formed from a polymer material comprising
(a) a copolymer of
(1) 0.5 to 8% by weight of monoethylenically unsaturated molecules comprising a compound of the formula

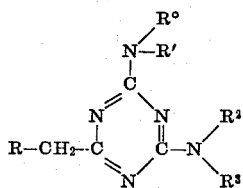

wherein
R is an alkenyl group having 3 to 9 carbon atoms and a terminal group of the formula $H_2C=C<$,
R° is selected from the group consisting of H, $CH_2OH$, and $CH_2OR''$ wherein R'' is the hydrocarbon residue of a saturated alcohol R''OH having 1 to 8 carbon atoms,
R' is selected from the group consisting of H, $CH_2OH$, and $CH_2OR''$,
$R^2$ is selected from the group consisting of H, $CH_2OH$, and $CH_2OR''$,
$R^3$ is selected from the group consisting of H, $CH_2OH$, and $CH_2OR''$ and
(2) 92 to 99.5% by weight of at least one other ethylenically unsaturated monomer and
(b) a polyfunctional reactant having a plurality of groups which are reactive with a reactive group in the copolymer the copolymer being crosslinked to solvent-resistant condition by virtue of reaction of at least one of the aforesaid reactive groups in the copolymer with reactive groups in the polyfunctional reactant.

5. An article as defined in claim 4 in which the polyfunctional reactant is a condensation product of formaldehyde with a member selected from the group consisting of phenol, urea, N,N'-ethyleneurea, thiourea, an aminotriazine, trisnitrilotripropionamide, a triazone, acetoguanamine, and isophthalamide.

6. An article as defined in claim 5, in which said ethylenically unsaturated monomer (2) is an alkyl acrylate wherein the alkyl group contains 1 to 4 carbon atoms.

7. An article as defined in claim 4 in which the polyfunctional reactant is a melamine-formaldehyde condensate.

8. An article as defined in claim 3 in which the 4-pentenoguanamine has an average of about one to four methylol groups substituted for hydrogen on its amino nitrogen.

9. As an article of manufacture, a cellular product having at least 5% of its volume in the form of voids, formed of a polymeric material comprising a copolymer of a mixture of ethylenically unsaturated molecules comprising about 0.5 to 8.0% by weight, based on the total weight of said molecules, of 4-pentenoguanamine having an average of about one to four methylol groups substituted for hydrogen on its amino nitrogen.

10. An article as defined in claim 3 in which the 4-pentenoguanamine has an average of about one to four methoxymethyl groups substituted for hydrogen on its amino nitrogen.

11. A method of producing a cellular product which comprises foaming a composition comprising a polymeric material comprising a copolymer of ethylenically unsaturated molecules comprising 0.5 to 8% by weight of a compound of the formula

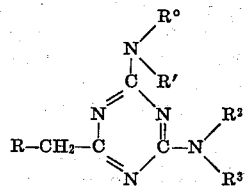

wherein
R is an alkenyl group having 3 to 9 carbon atoms and a terminal group of the formula $H_2C=C<$,
R° is selected from the group consisting of H, $CH_2OH$, and $CH_2OR''$ wherein R'' is the hydrocarbon residue of a saturated alcohol R''OH having 1 to 8 carbon atoms,
R' is selected from the group consisting of H, $CH_2OH$, and $CH_2OR''$,
$R_2$ is selected from the group consisting of H, $CH_2OH$, and $CH_2OR''$,
$R_3$ is selected from the group consisting of H, $CH_2OH$, and $CH_2OR''$.

12. A method as defined in claim 11 in which the copolymer contains a reactive group which reacts with itself to crosslink the mass to a solvent-resistant condition.

References Cited

UNITED STATES PATENTS

| | | | |
|---|---|---|---|
| 2,432,389 | 12/1947 | Daley | 260—2.5F |
| 2,510,503 | 6/1950 | Kropa | 260—868 |
| 2,787,603 | 4/1957 | Sanders | 260—29.4 |

MURRAY TILLMAN, Primary Examiner

M. FOELAK, Assistant Examiner

U.S. Cl. X.R.

260—15, 17, 17.3, 17.4, 21, 23.5, 29.4, 29.6, 67.6, 85.5, 85.7, 86.1, 87.5, 87.7, 88.1, 88.3, 853, 854, 855, 856